United States Patent
Chan et al.

(10) Patent No.: US 11,100,698 B2
(45) Date of Patent: Aug. 24, 2021

(54) REAL-TIME GPU RENDERING WITH PERFORMANCE GUARANTEED POWER MANAGEMENT

(71) Applicant: ATI Technologies ULC, Markham (CA)

(72) Inventors: Benjamin Koon Pan Chan, Markham (CA); William Lloyd Atkinson, Markham (CA); Clarence Ip, Unionville (CA); Tung Chuen Kwong, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/457,179

(22) Filed: Jun. 28, 2019

(65) Prior Publication Data
US 2020/0410747 A1 Dec. 31, 2020

(51) Int. Cl.
| | |
|---|---|
| *G06T 15/20* | (2011.01) |
| *G06T 1/20* | (2006.01) |
| *G09G 5/14* | (2006.01) |
| *G06F 15/78* | (2006.01) |

(52) U.S. Cl.
CPC ........ *G06T 15/205* (2013.01); *G06F 15/7814* (2013.01); *G06T 1/20* (2013.01); *G09G 5/14* (2013.01); *G09G 2320/0261* (2013.01)

(58) Field of Classification Search
None
See application file for complete search history.

(56) References Cited

U.S. PATENT DOCUMENTS

| | | |
|---|---|---|
| 4,980,836 A | 12/1990 | Carter et al. |
| 5,396,635 A | 3/1995 | Fung |
| 5,617,572 A | 4/1997 | Pearce et al. |

(Continued)

OTHER PUBLICATIONS

Yuan et al., "Buffering Approach for Energy Saving in Video Sensors", 2003 International Conference on Multimedia and Expo, Jul. 2003, 4 pages.

(Continued)

*Primary Examiner* — Ryan M Gray
(74) *Attorney, Agent, or Firm* — Kowert Hood Munyon Rankin and Goetzel PC; Rory D. Rankin

(57) ABSTRACT

Systems, apparatuses, and methods for performing real-time video rendering with performance guaranteed power management are disclosed. A system includes at least a software driver, a power management unit, and a plurality of processing elements for performing rendering tasks. The system receives inputs which correspond to rendering tasks which need to be performed. The software driver monitors the inputs that are received and the number of rendering tasks to which they correspond. The software driver also monitors the amount of time remaining until the next video synchronization signal. The software driver determines which performance setting will minimize power consumption while still allowing enough time to finish the rendering tasks for the current frame before the next video synchronization signal. Then, the software driver causes the power management unit to provide this performance setting to the plurality of processing elements as they perform the rendering tasks for the current frame.

20 Claims, 6 Drawing Sheets

(56) References Cited

U.S. PATENT DOCUMENTS

| | | |
|---|---|---|
| 5,692,202 A | 11/1997 | Kardach et al. |
| 6,334,167 B1 | 12/2001 | Gerchman et al. |
| 6,657,634 B1 | 12/2003 | Sinclair et al. |
| 7,028,200 B2 | 4/2006 | Ma |
| 7,085,941 B2 | 8/2006 | Li |
| 7,428,644 B2 | 9/2008 | Jeddeloh et al. |
| 7,437,579 B2 | 10/2008 | Jeddeloh et al. |
| 7,496,777 B2 | 2/2009 | Kapil |
| 7,613,941 B2 | 11/2009 | Samson et al. |
| 7,743,267 B2 | 6/2010 | Snyder et al. |
| 7,800,621 B2 | 9/2010 | Fry |
| 7,802,060 B2 | 9/2010 | Hildebrand |
| 7,840,827 B2 | 11/2010 | Dahan et al. |
| 7,868,479 B2 | 1/2011 | Subramaniam |
| 7,873,850 B2 | 1/2011 | Cepulis |
| 7,899,990 B2 | 3/2011 | Moll |
| 8,181,046 B2 | 5/2012 | Marcu et al. |
| 8,402,232 B2 | 3/2013 | Avudaiyappan et al. |
| 8,656,198 B2 | 2/2014 | Branover et al. |
| 9,110,674 B1 | 8/2015 | Cui et al. |
| 2007/0206018 A1* | 9/2007 | Bajic .................. G09G 5/363 345/501 |
| 2012/0293519 A1 | 11/2012 | Ribble et al. |
| 2014/0184619 A1* | 7/2014 | Kim .................. G06F 1/3296 345/519 |
| 2015/0317762 A1* | 11/2015 | Park .................. G06F 1/3206 345/505 |
| 2016/0011645 A1* | 1/2016 | Min .................. G06F 1/3206 713/322 |
| 2016/0055615 A1* | 2/2016 | Huang .................. G06F 1/3296 345/505 |
| 2016/0259392 A1* | 9/2016 | Weissmann .......... G06F 1/3243 |
| 2016/0370844 A1* | 12/2016 | Kumar .................. G06F 3/0416 |
| 2018/0101205 A1* | 4/2018 | Conroy .................. G06F 1/30 |
| 2018/0157315 A1* | 6/2018 | Ehsan .................. G06F 1/3206 |
| 2018/0300838 A1* | 10/2018 | Park .................. G09G 5/395 |
| 2019/0057484 A1* | 2/2019 | Iwamoto .................. G06T 1/20 |
| 2020/0097061 A1* | 3/2020 | Ostby .................. G06F 1/3212 |

OTHER PUBLICATIONS

"Intel Power Management Technologies for Processor Graphics, Display, and Memory: White Paper for 2010-2011 Desktop and Notebook Platforms", Intel Corporation, Aug. 2010, 10 pages.

International Search Report and Written Opinion in International Application No. PCT/IB2020/054450, dated Jul. 9, 2020, 8 pages.

* cited by examiner

| Number of Rendering Tasks | Time Remaining until VSync | Performance Setting |
|---|---|---|
| 1 | 10 ms | 3 |
| 2 | 10 ms | 4 |
| 3 | 10 ms | 4.5 |
| 4 | 10 ms | 5 |
| 5 | 10 ms | 6 |
| 1 | 9 ms | 3.5 |
| 2 | 9 ms | 4.5 |
| ... | ... | ... |

FIG. 4

REAL-TIME GPU RENDERING WITH PERFORMANCE GUARANTEED POWER MANAGEMENT

DESCRIPTION OF THE RELATED ART

Various applications rely on the real-time rendering of images or video content. For example, cloud gaming, virtual reality, and gaming spectatorship are examples of applications which involve real-time rendering of content. Real-time rendering of video frames often uses significant amounts of processing resources that consume a large amount of power. In a real-time rendering environment, the requirement to control generated image frame latencies and a desire to avoid missed frames places special demands on power management. On one hand, it is desirable to run at the highest clock rate possible to minimize the latency and guarantee the rendering of images finishes on time. On the other hand, if the processing hardware begins to overheat or nears a thermal threshold, the hardware will reduce its clock rate which then results in missed frames. These issues are particularly challenging for power or thermally constrained platforms.

Various frame-based real-time applications include gaming applications as well as other types of rendering applications that submit multiple jobs per frame and repeat this process at a constant or variable frame rate. The per-frame processing unit workload (e.g., number of jobs, time per job, resources per job) can vary in complexity and computational demand depending on the application runtime behavior. For such applications, the processing unit either completes frame execution sufficiently early to allow timely use of the frame (e.g., display or transmission), or the processing unit is late in completing frame execution, which results in the frame being dropped or consumed late. Such delays negatively impact the user experience.

In view of the above, improved methods for managing real-time video rendering with performance guaranteed power management are desired.

BRIEF DESCRIPTION OF THE DRAWINGS

The advantages of the methods and mechanisms described herein may be better understood by referring to the following description in conjunction with the accompanying drawings, in which:

FIG. 4 is an example of a table for mapping a number of incoming tasks and remaining time to performance setting in accordance with one implementation.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for implementing real-time GPU rendering with performance guaranteed power management governor based on use case driven event-based feed-forward control window are disclosed herein. In one implementation, a system includes at least a software driver, a power management unit, and one or more processing elements for performing rendering tasks. The system receives inputs which correspond to rendering tasks which need to be performed. The software driver monitors the number of inputs that are received and the number of rendering tasks to which they correspond. The software driver also monitors the amount of time remaining until the next video synchronization signal. The software driver determines which performance setting will minimize power consumption while still allowing enough time to finish the rendering tasks for the current frame before the next video synchronization signal. Then, the software driver causes the power management unit to provide this performance setting to the plurality of processing elements as they perform the rendering tasks for the current video frame.

Figure 1:
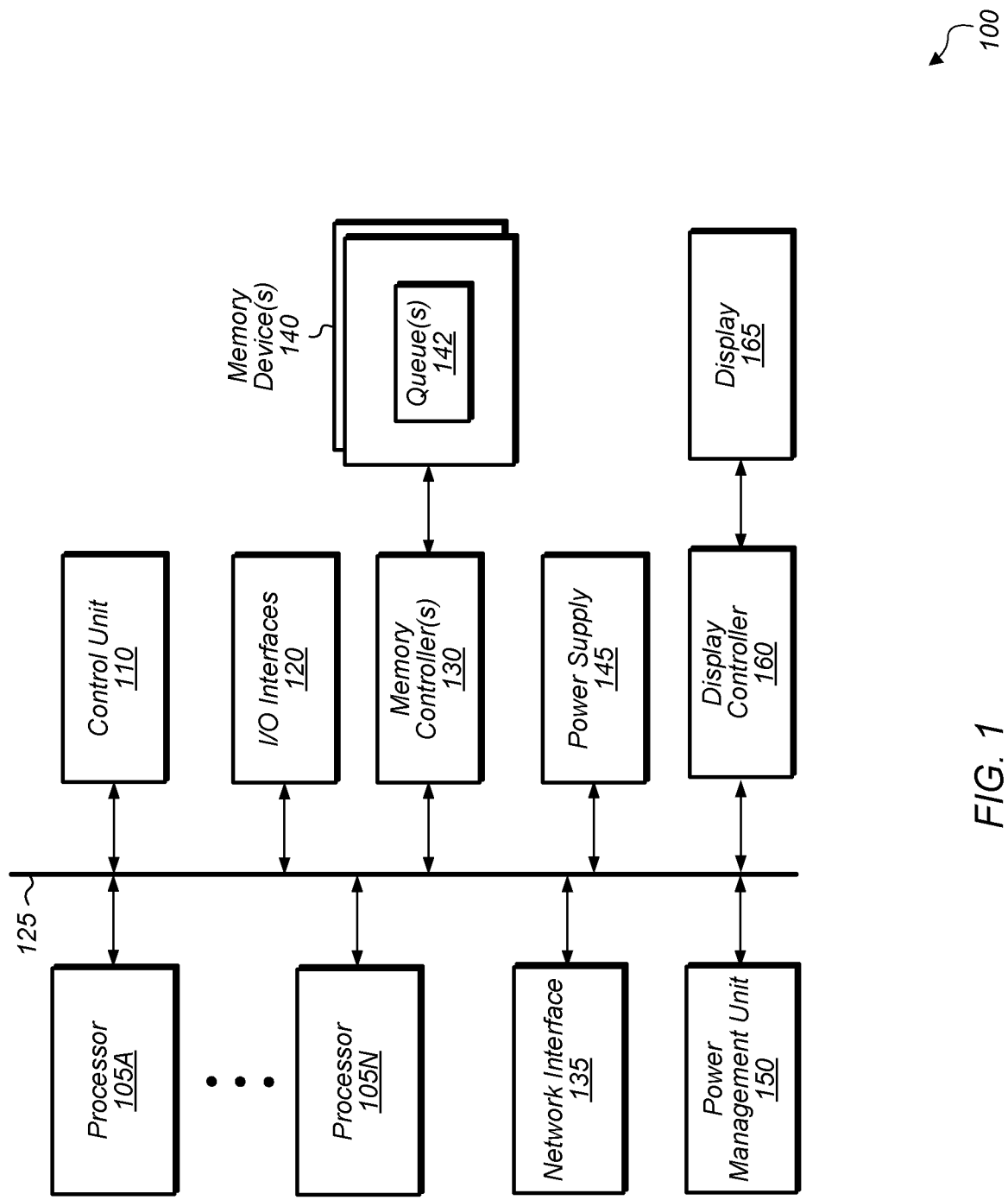
FIG. 1 is a block diagram of one implementation of a computing system.

Referring now to FIG. 1, a block diagram of one implementation of a computing system 100 is shown. In one implementation, computing system 100 includes at least processors 105A-N, control unit 110, input/output (I/O) interfaces 120, bus 125, memory controller(s) 130, network interface 135, memory device(s) 140, power supply 145, power management unit 150, display controller 160, and display 165. In other implementations, computing system 100 includes other components and/or computing system 100 is arranged differently. Processors 105A-N are representative of any number of processors which are included in system 100, with the number of processors varying from implementation to implementation.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In one implementation, processor 105N is a GPU which provides pixels to display controller 160 to be driven to display 165. In some implementations, processors 105A-N include multiple data parallel processors. In one implementation, control unit 110 is a software driver executing on processor 105A. In other implementations, control unit 110 includes control logic which is independent from processors 105A-N and/or incorporated within processors 105A-N. Generally speaking, control unit 110 is any suitable combination of software and/or hardware.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, media recording devices, external storage devices, network interface cards, and so forth. Network interface 135 is used to receive and send network messages across a network. Bus 125 is representative of any type of bus or fabric with any number of links for connecting together the different components of system 100.

In one implementation, queue(s) 142 are stored in memory devices(s) 140. In other implementations, queue(s) 142 are stored in other locations within system 100. Queue(s) 142 are representative of any number and type of queues which are allocated in system 100. In one implementation, queue(s) 142 store rendering tasks that are to be performed for frames being rendered. In one implementation, the rendering tasks are enqueued in queue(s) 142 based on inputs received via network interface 135. For example, in one scenario, the inputs are generated by a user of a video game application and sent over a network (not shown) to system 100. In another implementation, the inputs are generated by a peripheral device connected to I/O interfaces 120.

In one implementation, power management unit 150 supplies power from power supply 145 to components of system 100, and power management unit 150 controls various power-performance states of components within system 100. Responsive to receiving updates from control unit 110, the power management unit 150 causes other components within system 100 to either increase or decrease their current power-performance state. In various implementations, changing a power-performance state includes changing a current operating frequency of a device and/or changing a current voltage level of a device. When the power-performance states of processors 105A-N are reduced, this causes the computing tasks being executed by processors 105A-N to take longer to complete.

In one implementation, control unit 110 sends commands to power management unit 150 to cause processor 105N to operate at a relatively high power-performance state responsive to determining that a number of rendering tasks for the current frame is greater than a given threshold. In one implementation, the given threshold is adjusted based on the amount of time remaining until the next video synchronization signal. For example, the less time that remains until the next video synchronization signal, the lower the given threshold is programmed.

In various implementations, computing system 100 is a computer, laptop, mobile device, server, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1 and/or one or more of the components shown in computing system 100 are omitted. Additionally, in other implementations, computing system 100 is structured in other ways than shown in FIG. 1.

Figure 2:
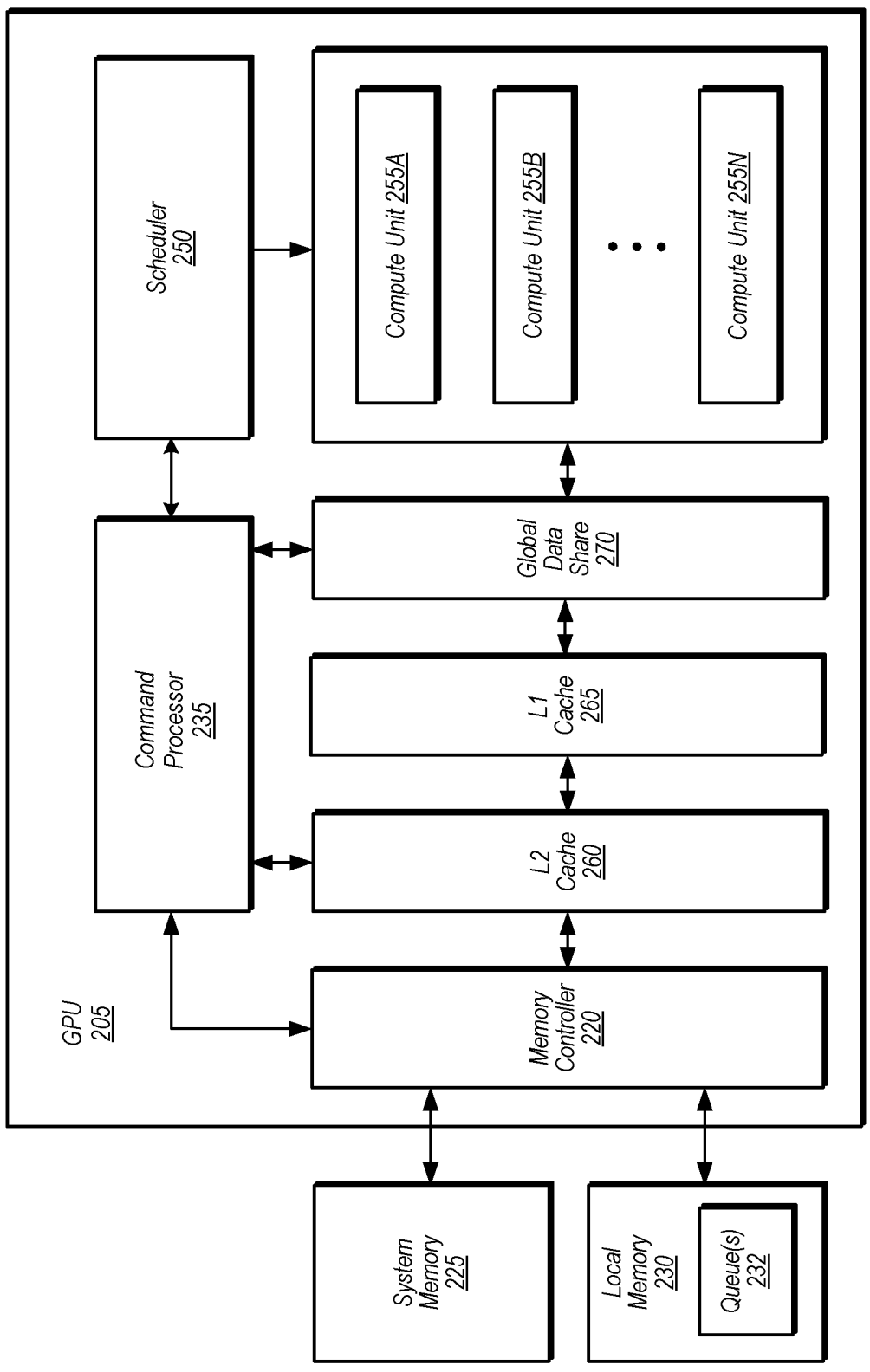
FIG. 2 is a block diagram of one implementation of a computing system.

Turning now to FIG. 2, a block diagram of another implementation of a computing system 200 is shown. In one implementation, system 200 includes GPU 205, system memory 225, and local memory 230 which belongs to GPU 205. System 200 also includes other components which are not shown to avoid obscuring the figure. GPU 205 includes at least command processor 235, scheduler 250, compute units 255A-N, memory controller 220, global data share 270, level one (L1) cache 265, and level two (L2) cache 260. It is noted that compute units 255A-N can also be referred to herein as a "plurality of processing elements". In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches rendering tasks to be performed on GPU 205. Command processor 235 receives commands from the host CPU and uses scheduler 250 to issue corresponding rendering tasks to compute units 255A-N. Rendering tasks executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N. In various implementations, compute units 255A-N execute any number of frame-based applications which are rendering frames to be displayed, streamed, or consumed in real-time. In one implementation, queue(s) 232 are stored in local memory 230. In other implementations, queue(s) 232 are stored in other locations within system 200. Queue(s) 232 are representative of any number and type of queues which are allocated in system 200. In one implementation, queue(s) 232 store rendering tasks to be performed by GPU 205.

In one implementation, the performance setting of GPU 205 is adjusted based on a number of rendering tasks for the current frame stored in queue(s) 232 as well as based on the amount of time remaining until the next video synchronization signal. In various implementations, the performance setting of GPU 205 is adjusted so as to finish the rendering tasks before the next video synchronization signal while also achieving a power consumption target. In one implementation, the performance setting is adjusted by a control unit (not shown). The control unit can be a software driver executing on a CPU (not shown) or the control unit can include control logic implemented within a programmable logic device (e.g., FPGA) or control logic implemented as dedicated hardware (e.g., ASIC). In some cases, the control unit includes a combination of software and hardware.

In one implementation, the performance setting of GPU 205 corresponds to a specific power setting, power state, or operating point of GPU 205. In one implementation, the control unit uses dynamic voltage and frequency scaling (DVFS) to change the frequency and/or voltage of GPU 205 to limit the power consumption to a chosen power allocation. Each separate frequency and voltage setting can correspond to a separate performance setting. In one implementation, the performance setting selected by the control unit controls a phase-locked loop (PLL) unit (not shown)

which generates and distributes corresponding clock signals to GPU 205. In one implementation, the performance setting selected by the control unit controls a voltage regulator (not shown) which provides a supply voltage to GPU 205. In other implementations, other mechanisms can be used to change the operating point and/or power settings of GPU 205 in response to receiving a command from the control unit to arrive at a particular performance setting.

Figure 3:
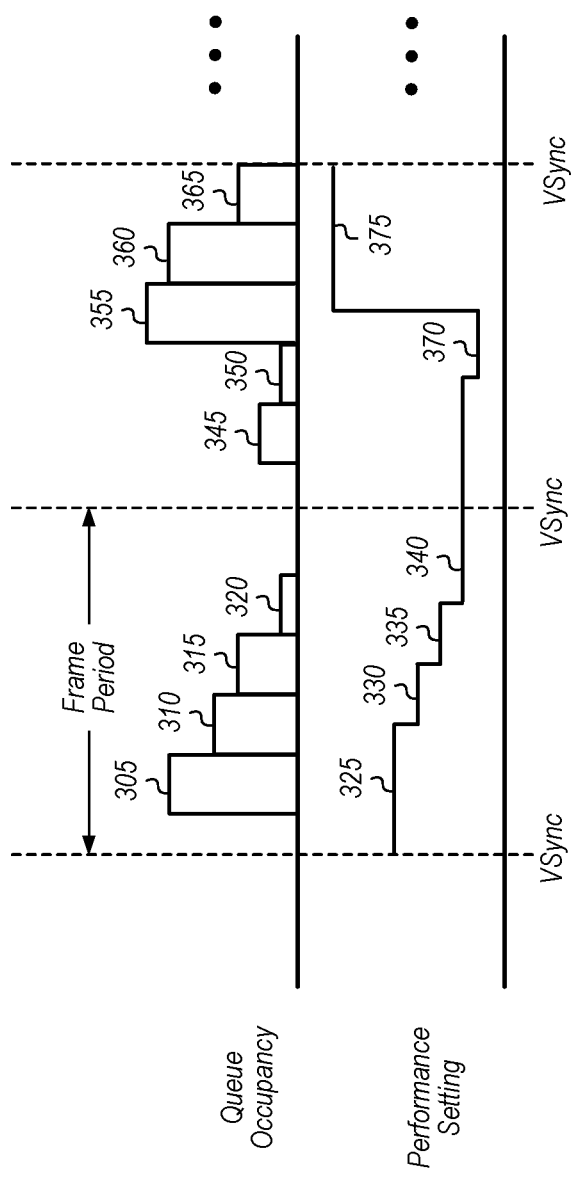
FIG. 3 is a timing diagram of one implementation of selecting a performance setting for frames being rendered based on queue occupancy.

Referring now to FIG. 3, a timing diagram of one implementation of selecting a performance setting for frames being rendered based on queue occupancy is shown. When rendering frames of a video sequence, in one implementation, a software driver changes the performance setting of the rendering hardware based at least in part on the queue occupancy. The queue occupancy refers to the number of rendering tasks that have been enqueued for the processing hardware (e.g., GPU) for the current frame being rendered.

A frame period is shown which is bounded by the video synchronization signals (or VSync's) corresponding to the start and finish of each frame being rendered. In the first frame period shown in FIG. 3, the initial performance setting 325 is set for the processing hardware for the frame being rendered. The initial performance setting 325 can be a default setting in one implementation. In another implementation, the initial performance setting 325 is programmable based on the type of application, hints generated by the application, an estimate of the complexity of the current frame being rendered, and/or based on other factors. In one implementation, the software driver responsible for controlling the performance setting monitors the queue occupancy of the rendering task queue(s). The software driver monitors the queue occupancy multiple times per frame period, and the frequency of monitoring can be either fixed or programmable depending on the implementation. As shown in FIG. 3, the first occupancy sample 305 specifies that a particular number of rendering tasks have been enqueued. Based on this sample 305, the software driver maintains the current performance setting 325.

The next queue occupancy sample 310 is a reduction from the previous sample 305. This indicates that the number of rendering tasks has decreased due to one or more rendering tasks having been completed by the processing hardware. Accordingly, in response to detecting the reduction in queue occupancy from sample 310 to sample 305, the software driver reduces the performance setting 330 to decrease power consumption of the processing hardware. This trend continues for the next two samples 315 and 320, with the software driver reducing the power for performance settings 335 and 340, respectively. This reduction in the performance setting is acceptable since the processing hardware has fewer rendering tasks to finish for the current frame. When the video synchronization signal occurs, the current frame is sent to the display, sent over a network to one or more clients, or sent to other locations.

For the next frame period, the first occupancy sample 345 indicates that there are relatively few rendering tasks for this frame. Accordingly, the performance setting 340 can remain at a relatively low level for the processing hardware at the start of the frame period. The next occupancy sample 350 indicates the number of rendering tasks has been reduced, allowing for a lower performance setting 370. However, the subsequent occupancy sample 355 indicates that the queue occupancy has increased. This can be due to receiving multiple rendering tasks, which can be caused by player inputs in a gaming scenario, user movements in a virtual reality environment, or other inputs generated or events in other types of applications.

When the software driver detects the increase in occupancy for occupancy sample 355, as well as a diminishing time remaining until the next video synchronization signal, the software driver responds by increasing the power provided to the processing hardware to performance setting 375. In one implementation, performance setting 375 is the maximum performance setting for the processing hardware. The next two occupancy samples 360 and 365 indicate that the number of rendering tasks for the current frame have been reduced. However, the time available for finishing these rendering tasks has also decreased, which means that the software driver will maintain the relatively high performance setting 375 for the processing hardware.

The examples shown in timing diagram 300 are indicative of one particular implementation for a software driver adjusting the performance setting based on the queue occupancy of the rendering task queue(s). In other implementations, the software driver can make other types of adjustments based on changes in the queue occupancy. It should be understood that the granularity at which updates to the performance setting are made can vary according to the implementation. Also, the frequency at which the software driver checks the queue occupancy can also vary according to the implementation.

Turning now to FIG. 4, one implementation of a table 400 for mapping a number of incoming tasks and remaining time to performance setting is shown. In one implementation, control logic or a software driver performs a lookup of columns 405 and 410 of table 400 to retrieve a corresponding performance setting. The retrieved performance setting is used to program a plurality of processing elements (e.g., GPU 205 of FIG. 2) to operate at a specific operating point. In one implementation, column 405 includes different possible values for a number of incoming tasks (e.g., rendering tasks). In other implementations, column 405 includes other values which represent the amount of work that needs to be performed for rendering the current frame. For example, in another implementation, column 405 is measured in terms of queue occupancy. In other implementations, column 405 is measured in terms of a number of hints received, a number of events detected, or otherwise. In one implementation, column 410 includes entries for different amount of time remaining until the next video synchronization signal.

In one implementation, a software driver performs a lookup of table 400 using a number of rendering tasks and an amount of time remaining until the next video synchronization signal. A performance setting is retrieved from the matching entry if the lookup results in a hit. If the lookup results in a miss, then the software driver can interpolate a performance setting value based on the two closest entries. After retrieving and/or calculating a particular performance setting, the software driver causes the rendering hardware to operate at the particular performance setting. In one implementation, the software driver performs multiple lookups per frame to table 400 to update the performance setting as the number of rendering tasks and/or an amount of time remaining changes during the frame period.

In one implementation, there is a separate table 400 for each different application that could run on the system. For example, for a cloud gaming environment, a first table 400A is stored by the system. For a virtual reality application, a second table 400B is stored by the system. Any number of other tables 400C-N can also be stored by the system for different applications. Each application can have different characteristics and complexity for the rendering tasks likely to be performed when executing the application. Accordingly, each application has a separate table 400 to accommodate the different performance settings that should be used based on the number of rendering tasks and time remaining.

In one implementation, each table 400 is programmed by software. The tables 400 can be programmed based on test data and/or the tables 400 can be programmed based on real-time training based on monitoring the application's behavior. For example, in one implementation, table 400 is programmed by software with default values for a given application. Then, during runtime, software can monitor the given application to see if any changes have been observed in the run-time environment as compared to the test scenarios that were used to generate the default values for table 400. If rendering tasks are taking longer than predicted, or if rendering tasks are finished sooner than predicted, the values stored in performance setting column 415 can be updated to more accurately reflect the given application's behavior. In another implementation, rather than using table 400 to select a performance setting, the software driver uses a formula for calculating the performance setting based on a number of incoming tasks and time remaining. In other implementations, the software driver uses other suitable techniques for selecting the performance setting.

Figure 5:
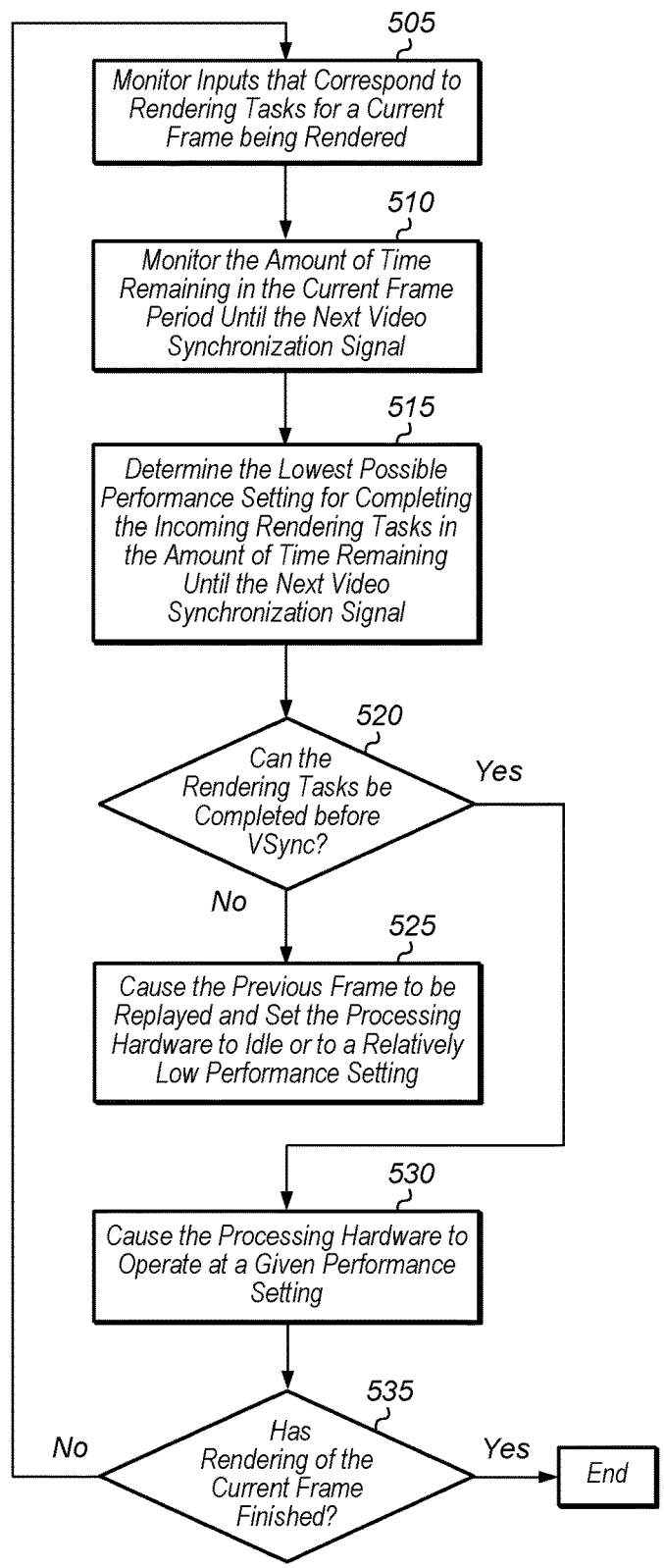
FIG. 5 is a generalized flow diagram illustrating one implementation of a method for performing real-time video rendering with performance guaranteed power management.
Figure 6:
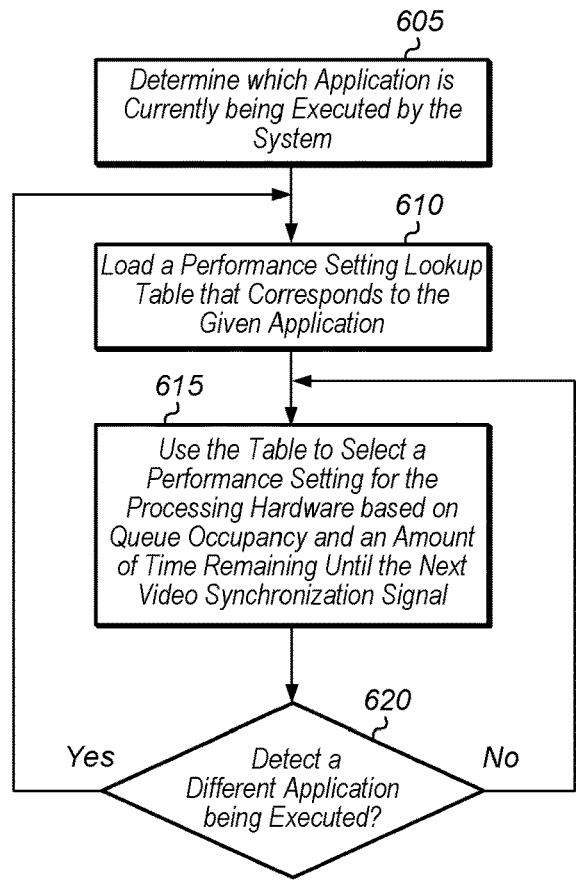
FIG. 6 is a generalized flow diagram illustrating one implementation of a method for controlling the performance setting for processing hardware based on application type.

Turning now to FIG. 5, one implementation of a method 500 for performing real-time video rendering with performance guaranteed power management is shown. For purposes of discussion, the steps in this implementation and those of FIG. 6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A software driver monitors inputs that corresponds to rendering tasks for a current frame being rendered (block 505). In one implementation, the inputs are events associated with a user on a network. For example, the user is playing a video game in a cloud-gaming scenario. In another implementation, the inputs are user movements in a virtual reality environment. In other implementations, other types of inputs for other types of scenarios are received in block 505. Also, the software driver monitors the amount of time remaining in the current frame period until the next video synchronization signal (block 510). Next, the software driver determines the lowest possible performance setting for completing the incoming rendering tasks in the amount of time remaining until the next video synchronization signal (block 515). In one implementation, the performance setting for the processing hardware (e.g., GPU) includes corresponding voltage and frequency values.

If the software driver determines that the incoming rendering tasks cannot be completed in the amount of time remaining until the next video synchronization signal even at the maximum performance setting (conditional block 520, "no" leg), then the software driver causes the previous frame to be replayed and the processing hardware is set to idle or to a relatively low performance setting (e.g., a lowest possible performance setting) (block 525). Alternatively, the software driver can cause the current frame to be delayed in block 525 rather than replaying the previous frame. If there is a performance setting that allows the incoming rendering tasks to be completed in the time remaining until the next Vsync (conditional block 520, "yes" leg), then the software driver causes the processing hardware to operate at a given performance setting (block 530). In one implementation, the given performance setting is the lowest possible performance setting for completing the incoming rendering tasks in the amount of time remaining until the next video synchronization signal. In another implementation, the given performance setting is one setting higher than the lowest possible performance setting to provide a margin of error for completing the incoming rendering tasks in the amount of time remaining until the next video synchronization signal. In other implementations, the margin of error can be increased to two or more settings higher than the lowest possible performance setting.

If rendering of the current frame has not finished (conditional block 540, "no" leg), then after some amount of time elapses, or after some event (i.e., a change in queue occupancy) is detected, method 500 returns to block 505. It is noted that some hysteresis can be added to the loop to prevent the performance setting from being changed too frequently. If rendering of the current frame has finished (conditional block 540, "yes" leg), then method 500 ends. It is noted that method 500 can be performed for each video frame of a video sequence being rendered.

Turning now to FIG. 6, one implementation of a method 600 for controlling the performance setting for processing hardware based on application type is shown. A control unit determines which application is currently being executed by the system (block 605). Then, the control unit loads a performance setting lookup table (e.g., table 400 of FIG. 4) that corresponds to the application (block 610). Next, the control unit uses the table to select a performance setting for the processing hardware based on queue occupancy and an amount of time remaining until the next video synchronization signal (block 615). If the control unit detects a different application being executed by the system (conditional block 620, "yes" leg), then method 600 returns to block 610. Otherwise, if the given application continues to be executed by the system (conditional block 620, "no" leg), then method 600 returns to block 615. It is noted that in some cases, a single application can have multiple different performance setting lookup tables. For example, a video game application can have different scenes with different amount of rendering complexity. For a first scene of the application, the control unit can load a first table, for a second scene, the control unit loads a second table, and so on.

In various implementations, program instructions of a software application are used to implement the methods and/or mechanisms described herein. For example, program instructions executable by a general or special purpose processor are contemplated. In various implementations, such program instructions can be represented by a high level programming language. In other implementations, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   one or more processing elements;
   a power management unit; and
   a control unit configured to:
   monitor inputs representative of how many rendering tasks are waiting to be performed for a current frame being rendered;
   monitor an amount of time remaining until a next video synchronization signal;
   select a given performance setting for allowing one or more rendering tasks to be completed in the amount of time remaining until the next video synchronization signal while also achieving a power consumption target; and
   convey an indication of the given performance setting to the power management unit to cause the one or more processing elements to operate at the given performance setting.

2. The system as recited in claim 1, wherein the control unit is configured to increase the given performance setting responsive to determining the inputs indicate that more rendering tasks have been queued while the amount of time remaining until the next video synchronization signal has decreased.

3. The system as recited in claim 1, wherein the control unit is configured to select a lowest possible performance setting which allows the one or more rendering tasks to be completed in the amount of time remaining until the next video synchronization signal.

4. The system as recited in claim 1, wherein the control unit is configured to map a combination of a number of rendering tasks and the amount of time remaining to the given performance setting.

5. The system as recited in claim 4, wherein the control unit is configured to maintain a table for mapping the combination of the number of rendering tasks and the amount of time remaining to the given performance setting, wherein each entry in the table maps a given number of rendering tasks and a given amount of time remaining to a corresponding performance setting.

6. The system as recited in claim 1, wherein the inputs comprise user movements in a virtual reality environment.

7. The system as recited in claim 1, wherein the control unit is further configured to:
   cause the one or more processing elements to operate at a relatively high performance setting responsive to determining that the number of rendering tasks is greater than a threshold, wherein the threshold is based on the amount of time remaining until the next video synchronization signal; and
   cause the one or more processing elements to operate at a relatively low performance setting responsive to determining that the number of rendering tasks is less than or equal to the threshold.

8. A method comprising:
   monitoring, by a control unit, inputs representative of how many rendering tasks are waiting to be performed for a current frame being rendered;
   monitoring an amount of time remaining until a next video synchronization signal;
   selecting a given performance setting for allowing one or more rendering tasks to be completed in the amount of time remaining until the next video synchronization signal while also achieving a power consumption target; and
   conveying an indication of the given performance setting to a power management unit to cause one or more processing elements to operate at the given performance setting.

9. The method as recited in claim 8, further comprising increasing the given performance setting responsive to determining the inputs indicate that more rendering tasks have been queued while the amount of time remaining until the next video synchronization signal has decreased.

10. The method as recited in claim 8, further comprising selecting a lowest possible performance setting which allows the one or more rendering tasks to be completed in the amount of time remaining until the next video synchronization signal.

11. The method as recited in claim 8, further comprising mapping a combination of a number of rendering tasks and the amount of time remaining to the given performance setting.

12. The method as recited in claim 11, further comprising maintaining a table for mapping the combination of the number of rendering tasks and the amount of time remaining to the given performance setting, wherein each entry in the table maps a given number of rendering tasks and a given amount of time remaining to a corresponding performance setting.

13. The method as recited in claim 8, wherein the inputs comprise user movements in a virtual reality environment.

14. The method as recited in claim 8, further comprising:
   causing the one or more processing elements to operate at a relatively high performance setting responsive to determining that the number of rendering tasks is greater than a threshold, wherein the threshold is based on the amount of time remaining until the next video synchronization signal; and
   causing the one or more processing elements to operate at a relatively low performance setting responsive to determining that the number of rendering tasks is less than or equal to the threshold.

15. An apparatus comprising:
   a first processor;
   a second processor; and
   a memory storing program instructions, wherein the program instructions are executable by the first processor to:
   monitor inputs representative of how many rendering tasks are waiting to be performed for a current frame being rendered;
   monitor an amount of time remaining until a next video synchronization signal;
   select a given performance setting for allowing one or more rendering tasks to be completed in the amount of time remaining until the next video synchronization signal while also achieving a power consumption target; and
   cause the second processor to operate at the given performance setting.

16. The apparatus as recited in claim 15, wherein the program instructions are executable by the first processor to increase the given performance setting responsive to determining the inputs indicate that more rendering tasks have been queued while the amount of time remaining until the next video synchronization signal has decreased.

17. The apparatus as recited in claim 15, wherein the program instructions are executable by the first processor to select a lowest possible performance setting which allows the one or more rendering tasks to be completed in the amount of time remaining until the next video synchronization signal.

18. The apparatus as recited in claim 15, wherein the program instructions are executable by the first processor to map a combination of a number of rendering tasks and the amount of time remaining to the given performance setting.

19. The apparatus as recited in claim 18, wherein the program instructions are executable by the first processor to maintain a table for mapping the combination of the number of rendering tasks and the amount of time remaining to the given performance setting, wherein each entry in the table maps a given number of rendering tasks and a given amount of time remaining to a corresponding performance setting.

20. The apparatus as recited in claim 15, wherein the program instructions are executable by the first processor to:
    cause the second processor to operate at a relatively high performance setting responsive to determining that the number of rendering tasks is greater than a threshold, wherein the threshold is based on the amount of time remaining until the next video synchronization signal;
    cause the second processor to operate at a relatively low performance setting responsive to determining that the number of rendering tasks is less than or equal to the threshold.

* * * * *